US005938072A

United States Patent [19]

Lamoureux et al.

[11] Patent Number: 5,938,072

[45] Date of Patent: Aug. 17, 1999

[54] ROLLED COIN DISPENSER

[75] Inventors: Eric Lamoureux, Chatham; Frederic Morin, Montreal; Frederic Gouin, Candiac, all of Canada

[73] Assignee: Magner Corporation, Durham, Conn.

[21] Appl. No.: 08/931,293

[22] Filed: Sep. 16, 1997

[51] Int. Cl.[6] .............................. B65H 3/36; A01C 9/00; G07F 11/00

[52] U.S. Cl. ................................ 221/253; 221/218; 221/7

[58] Field of Search .................................... 221/253, 218, 221/7

[56] References Cited

U.S. PATENT DOCUMENTS

| | | | |
|---|---|---|---|
| 808,067 | 12/1905 | Briggs . | |
| 1,600,188 | 9/1926 | McNeely | 221/253 |
| 2,570,516 | 10/1951 | Bowman | 221/253 |
| 2,840,265 | 6/1958 | Noyes . | |
| 3,447,707 | 6/1969 | Furst | 221/253 |
| 3,593,881 | 7/1971 | Paap . | |
| 3,746,212 | 7/1973 | Anderheggen et al. | 221/253 |
| 3,811,552 | 5/1974 | Wagers, Jr. et al. . | |
| 3,837,139 | 9/1974 | Roseberg | 221/7 |
| 3,914,579 | 10/1975 | Shigemore et al. . | |
| 4,008,812 | 2/1977 | Stuart . | |
| 4,190,066 | 2/1980 | Burnside . | |
| 4,396,828 | 8/1983 | Dino et al. | 221/7 |
| 4,469,245 | 9/1984 | Fish et al. . | |
| 4,496,075 | 1/1985 | Ray . | |
| 4,669,393 | 6/1987 | Wuthrich . | |
| 4,717,044 | 1/1988 | Suzuki et al. . | |
| 4,840,290 | 6/1989 | Nakamura et al. | 221/225 |
| 4,860,922 | 8/1989 | Malservise et al. . | |
| 4,922,837 | 5/1990 | McGunn . | |
| 4,940,162 | 7/1990 | Thie . | |
| 4,951,308 | 8/1990 | Bishop et al. . | |
| 4,958,976 | 9/1990 | Haueter . | |
| 4,966,304 | 10/1990 | Kelly . | |
| 5,016,546 | 5/1991 | Haueter . | |
| 5,110,009 | 5/1992 | Gartner et al. | 221/266 |
| 5,340,967 | 8/1994 | Martin et al. . | |
| 5,409,092 | 4/1995 | Itako et al. . | |
| 5,458,536 | 10/1995 | Kargathra et al. | 221/6 |
| 5,459,536 | 10/1995 | Kargathra et al. . | |
| 5,743,429 | 4/1998 | Morofsky | 221/253 |

FOREIGN PATENT DOCUMENTS 296 09 900 9/1996 Germany .

OTHER PUBLICATIONS

Photograph—Five Note Cash Dispenser Mechanism, Aug. 15, 1996.

Photograph—ASCOM Rolled Coin Dispenser (2000 Rolls), Aug. 15, 1996.

Photograph—Rolled Coin Cassette With Conveyor, Aug. 15, 1996.

Literature On ASCOM E/B/S Coin & Roll Changer, Aug. 15, 1996.

*Primary Examiner*—Kenneth Noland
*Assistant Examiner*—Wonki Park
*Attorney, Agent, or Firm*—Pepe & Hazard LLP

[57] ABSTRACT

A coin roll dispenser has a number of coin magazines each filled with rolls of coins of a given denomination and removably seated within a housing. Each magazine has a motorized conveyor adapted to receive and sequentially dispense individual coin rolls through a discharge aperture into a discharge passage which transports the coin rolls dispensed from the magazines to a receptacle from which they may be removed by a purchaser. Dispensing is controlled by activating the conveyor in selected magazines. A first sensor detects the coin rolls as they are dispensed from the magazines and a sensor in advance of the receptacle produces a total count which is compared with the total ordered and the total from the first sensor.

18 Claims, 9 Drawing Sheets

ROLLED COIN DISPENSER

BACKGROUND OF THE INVENTION

The present invention relates to dispensing devices for coins, and, more particularly, to a device for dispensing coins rolls.

Commercial establishments such as stores, restaurants and theaters often require substantial amounts of coinage to be used in making change for their customers. Commonly, such establishments secure the necessary coins in the form of rolls of coins obtained from banks or other financial institutions. The financial institutions, however, find the dispensing of coin rolls to be costly in terms of employee time and the need for storage of large amounts of coin rolls in the teller area. Moreover, even as commercial establishments remain open for longer hours, the number of bank branches and their hours of service are decreasing. Thus, it frequently occurs that the banks are closed at times when their customers need coinage.

As a result, some banks have sought to install coin roll dispensing machines in locations which are accessible 24 hours per day. However, existing coin roll dispensers have been subject to criticism on the basis of unreliability, complexity of operation, lack of sufficient coin storage capacity, or inability to handle plastic wrapped coin rolls which may be somewhat irregular in shape.

Accordingly, it is an object of the present invention to provide a novel rolled coin dispenser which is highly reliable and easy to operate.

It is also an object to provide such a rolled coin dispenser which has a large storage capacity, is readily refilled and will accept and dispense plastic wrapped coin rolls.

Another object is to provide such a rolled coin dispenser which provides a desirable degree of protection against theft.

SUMMARY OF THE INVENTION

It has now been found that the foregoing and related objects may be readily attained in a coin roll dispenser which has a frame in which are removably seated a plurality of coin magazines each adapted to receive a multiplicity of coin rolls. The magazines have a base, side walls, a rear wall and a front wall defining a compartment for coin rolls. An endless conveyor in the compartment has pockets extending over its length each adapted to seat and carry an individual coin roll. The conveyor extends at an acute angle from the base to a discharge aperture in the front wall to deliver the coin rolls to the discharge aperture.

Flow directing means are provided in the compartment for directing coin rolls into the conveyor pockets, and include a first flow directing member projecting from the rear wall and terminating adjacent the conveyor to direct coin rolls thereonto. A second flow directing member projects from the front wall above the discharge aperture and angularly downwardly over the conveyor and the first flow directing member. The second flow directing member is spaced above the first flow directing member a distance sufficiently large to allow passage of coin rolls therebetween. A separator is disposed above the conveyor for blocking passage to the discharge aperture of coin rolls not seated in the conveyor pockets.

Also included is drive means for the conveyor and control means for activating the conveyor in selected magazines to dispense a desired number of rolls of coins through the discharge aperture.

The control means includes first detecting means for detecting coin rolls dispensed from the selected magazine and means for deactivating the conveyor drive means upon detection of a predetermined number of coin rolls. Desirably, this is an infrared sensor mounted on the frame for detecting coin rolls dispensed from any one of the magazines.

The second flow directing member is inclined from the front wall at an angle of about 30° from the horizontal, and the flow directing means also desirably includes a third flow directing member projecting from the rear wall above the first flow directing member.

Desirably, the magazines have rollers on the base thereof for movement inwardly and outwardly of the frame, and the drive means comprises a motor in each of the coin magazines.

Generally, a housing encloses the magazines and includes a discharge passage from the discharge apertures to a dispenser opening. Preferably, a second detector is provided in this discharge passage for counting all of the coin rolls passing to the dispenser opening to determine the total of coin rolls being dispensed.

In its preferred form, the housing includes a receptacle for receiving coin rolls dispensed from the magazines and from which they may be removed by a purchaser, and transport means in the discharge passage for transporting dispensed coil rolls from the magazines to the receptacle. The second detector detects coin rolls passing along the transport means toward the receptacle, and the detector is preferably an inductive proximity sensor.

The control means includes means for comparing the total number of rolls of coins detected by the first detector with the number detected by the second detector and with the number requested by a purchaser and for providing an error indication in the event of a discrepancy.

DETAILED DESCRIPTION OF THE PREFERRED EMBODIMENT

Figure 1:
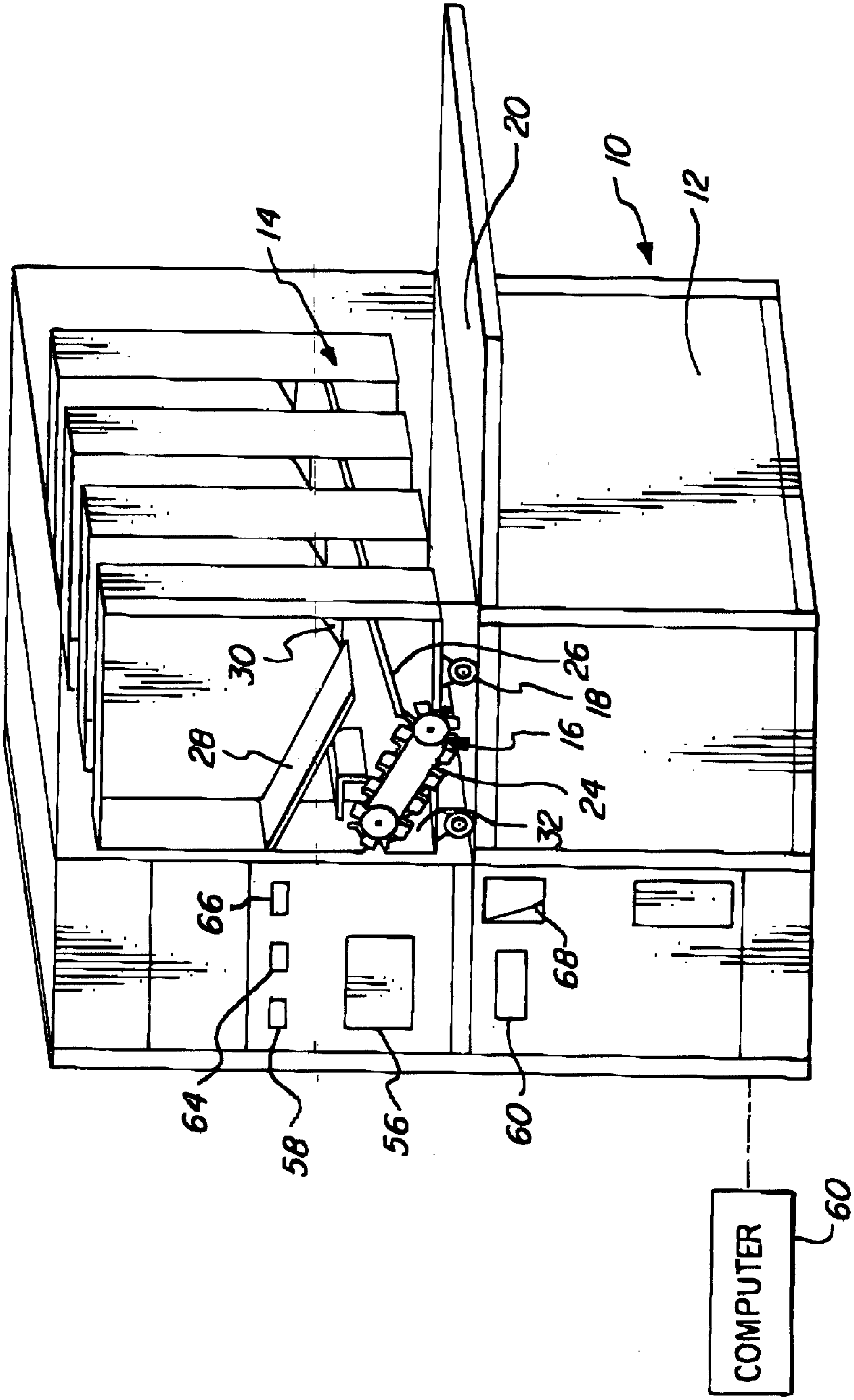
FIG. 1 is a perspective view of a coin roll dispenser embodying the present invention with a portion of the housing and magazine side wall removed with the side panel opened.
Figure 7:
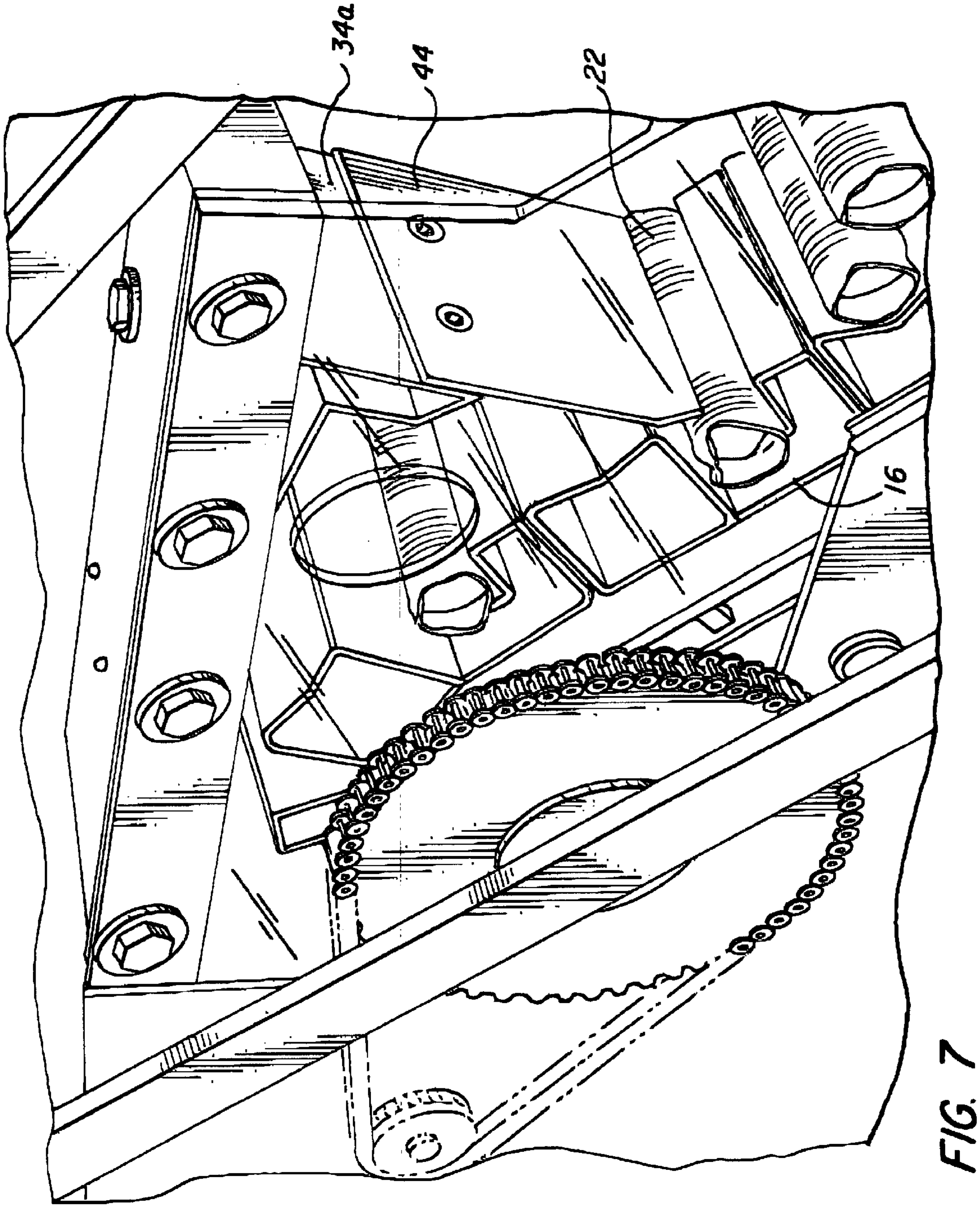
FIG. 7 is an enlarged perspective view of the conveyor and separator.
Figure 8:
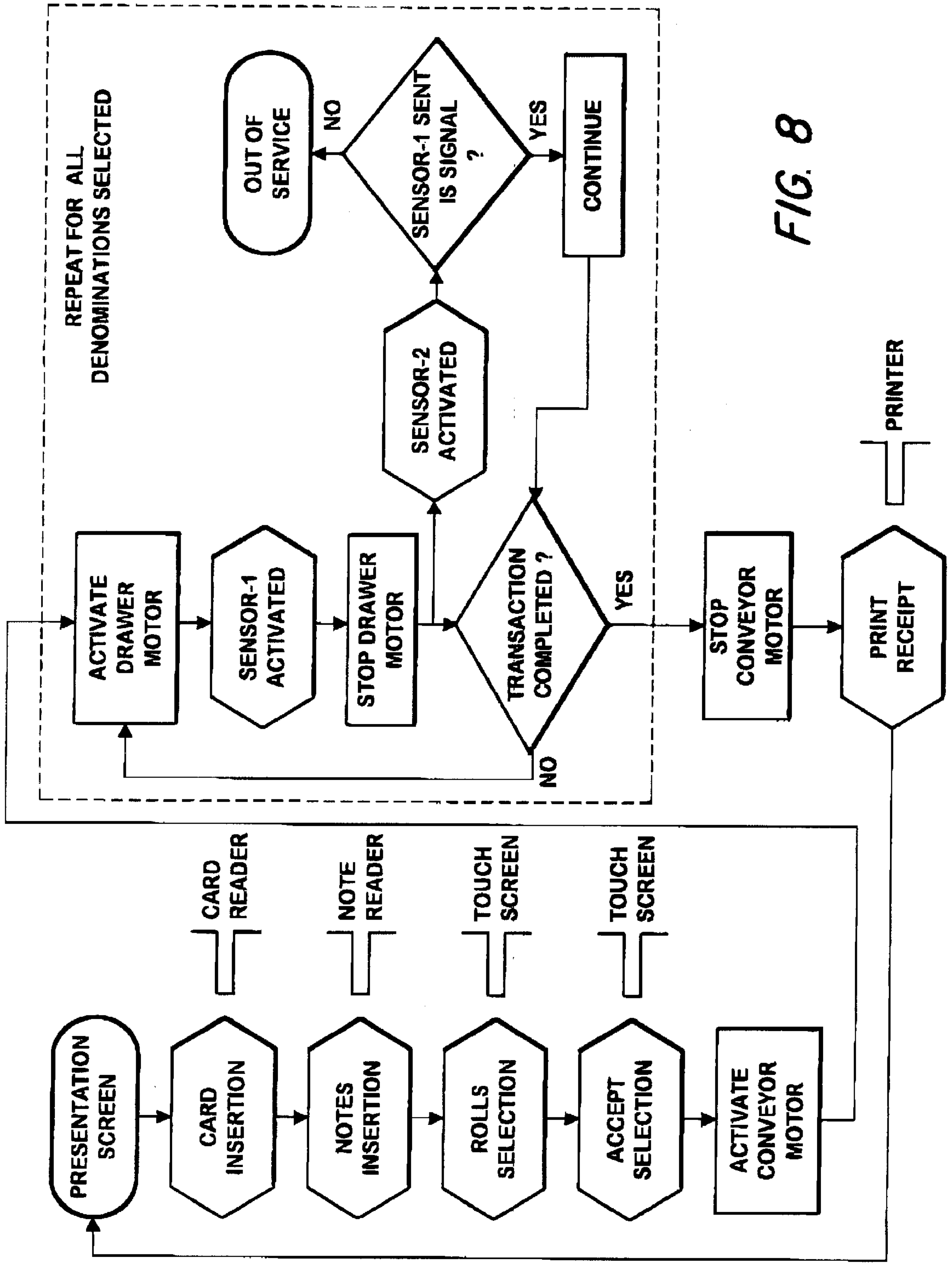
FIG. 8 is a flow chart of the coin roll dispensing process performed by the control system of the coin dispenser.

Turning first to FIG. 1 of the attached drawings, therein illustrated is a coin roll dispenser having a frame 10 with wall panels 12 providing a housing in which are seated side-by-side a multiplicity of coin roll magazines generally designated by the numeral 14, each adapted to receive a substantial amount of rolls of coins of a single denomination. Each of the magazines 14 includes an endless conveyor 16 adapted to receive and dispense coin rolls 22 (seen in FIG. 7) which are directed into pockets 24 spaced along its length by flow directing devices 26, 28 and 30.

The magazines 14 have rollers 18 on their bases so that they may be rolled from the position seen in FIG. 1 onto the drop down support table 20 to facilitate changing or refilling them. Not shown is a cover panel which must be first removed.

Figure 2:
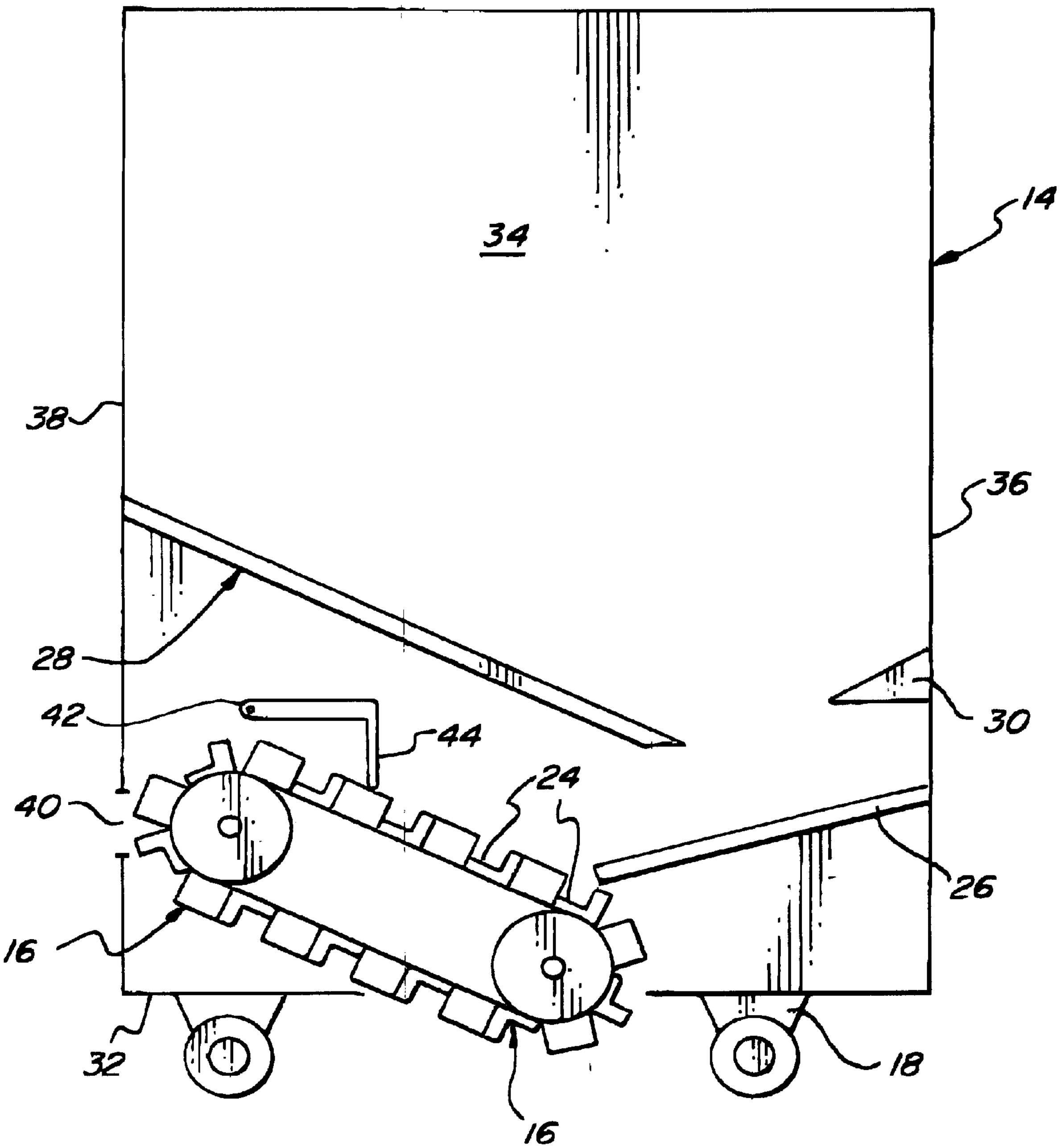
FIG. 2 is a partially diagrammatic side elevational view of one of the coin magazines of the coin roll dispenser of FIG. 1.

As best seen in FIG. 2, each magazine 14 has a base 32, side walls 34, a rear wall 36 and a front wall 38 with a discharge aperture 40. One side wall 34*a* is desirably a transparent panel which is hinged at the front wall thereof so that it may be opened readily to fill the magazine.

The first flow directing member 26 slopes downwardly from the rear wall 36 and terminates adjacent the conveyor 16. The second flow directing member 28 projects from the front wall 38 above the discharge aperture 40 and extends over the conveyor 16 and the first flow directing member 26. The second flow directing member 28 is spaced above the first flow directing member 26 a distance sufficient to allow passage of a short stack of several coin rolls therebetween. The second flow directing member 28 is inclined at an angle of about 30° from the horizontal to ensure that the rolls of coins 22 form essentially vertical stacks which feed smoothly onto the conveyor 16 without jamming, as seen in FIG. 6.

Pivotably supported on the side wall 34 is a separator 42 which is disposed intermediate the conveyor 16 and the second flow directing member 28. It is of generally L-shaped configuration with a flexible leg 44 extending to a point adjacent the upper surface of the conveyor 16. In the event that coin rolls not within the pockets 24 are moving upwardly on the conveyor 16, the separator 42 acts to preclude their movement thereby. Desirably, it is resiliently deflectable to allow it to clear the periphery of coin rolls 22 seated in the pockets 24 which may have a diameter greater than the depth of the recess provided by the pocket 24 to avoid injury to the wrapper and then return to a blocking position.

Advantageously, a third inclined, planar flow directing member 30 is supported on the rear wall 36 above the first flow directing member 26 and above the lowest point of the second flow directing member 28. This member 30 cooperates with the second flow directing member 28 to produce a desirable alignment of the rolls 22 relative to the angle of the conveyor 16.

Figure 6:
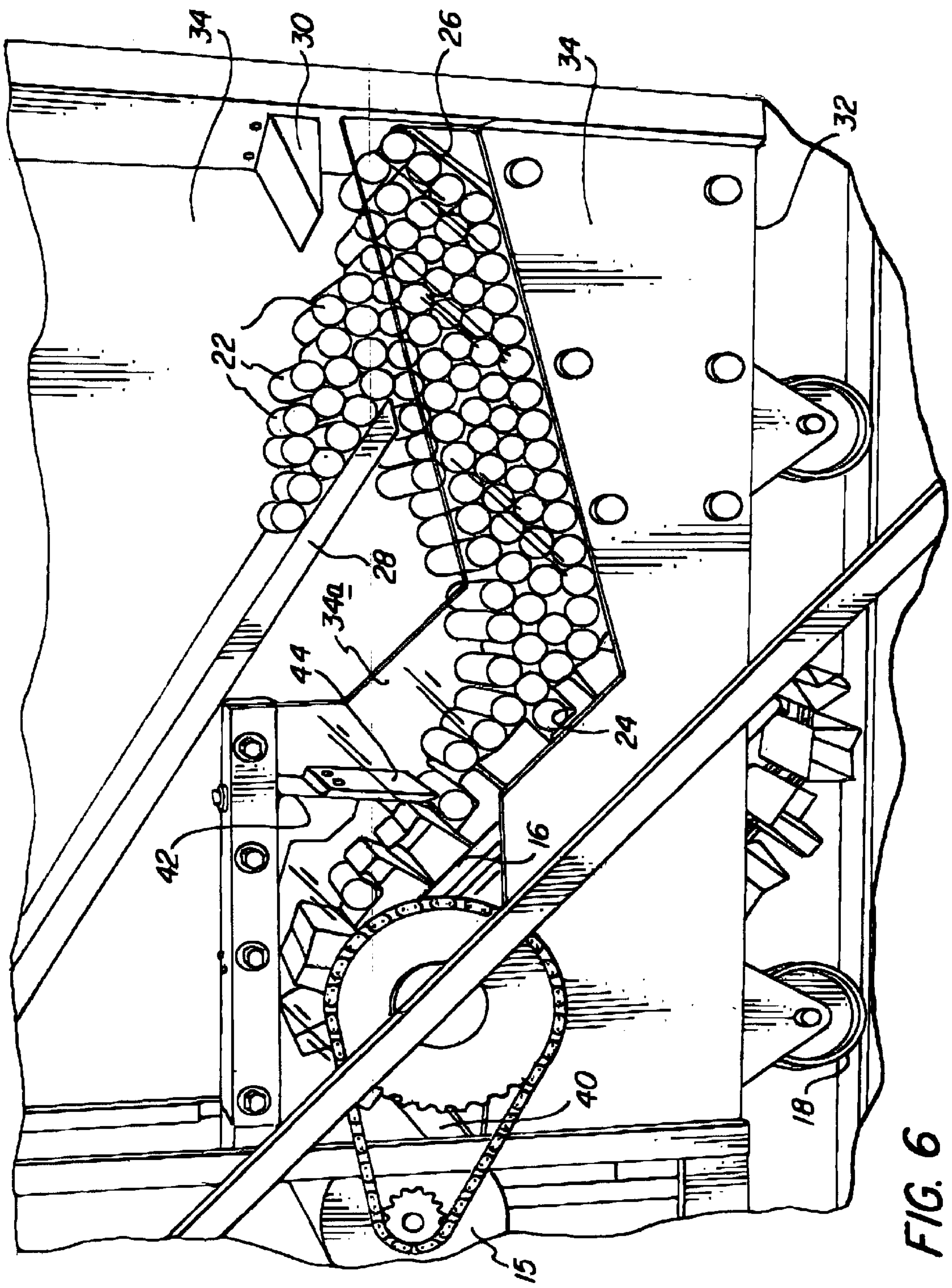
FIG. 6 is a side elevational view of a magazine as loaded with coin rolls.

As best seen in FIG. 6, the angular and positional relationship of the flow directing members 26, 28 and 30 and of the conveyor 16 provides a relatively smooth feed of the rolls 22 into the pockets 24 of the conveyor 16. The slope of the flow directing member 26 is about 20° to the horizontal and produces a smooth and relatively slow feed into the pockets 24 of the conveyor 16 which is moving at a lineal speed of about 2 inches per second.

The slope of the flow directing member 28 is about 30° to the horizontal and this produces an almost vertical alignment of the roll stack at the point of movement toward the pockets 24 and effectively precludes turbulence in the stack at the point of feed. The rolls 22 can recirculate at the feed point because of the relatively low pressure of the several rolls in the stack produced by the weight and thus are less likely to be damaged.

The third flow directing member 30, as previously described, cooperates with the second flow directing member 28 to provide a relatively linear array of the coin rolls sloping toward the point of feed into the conveyor pockets 24.

Figure 3:
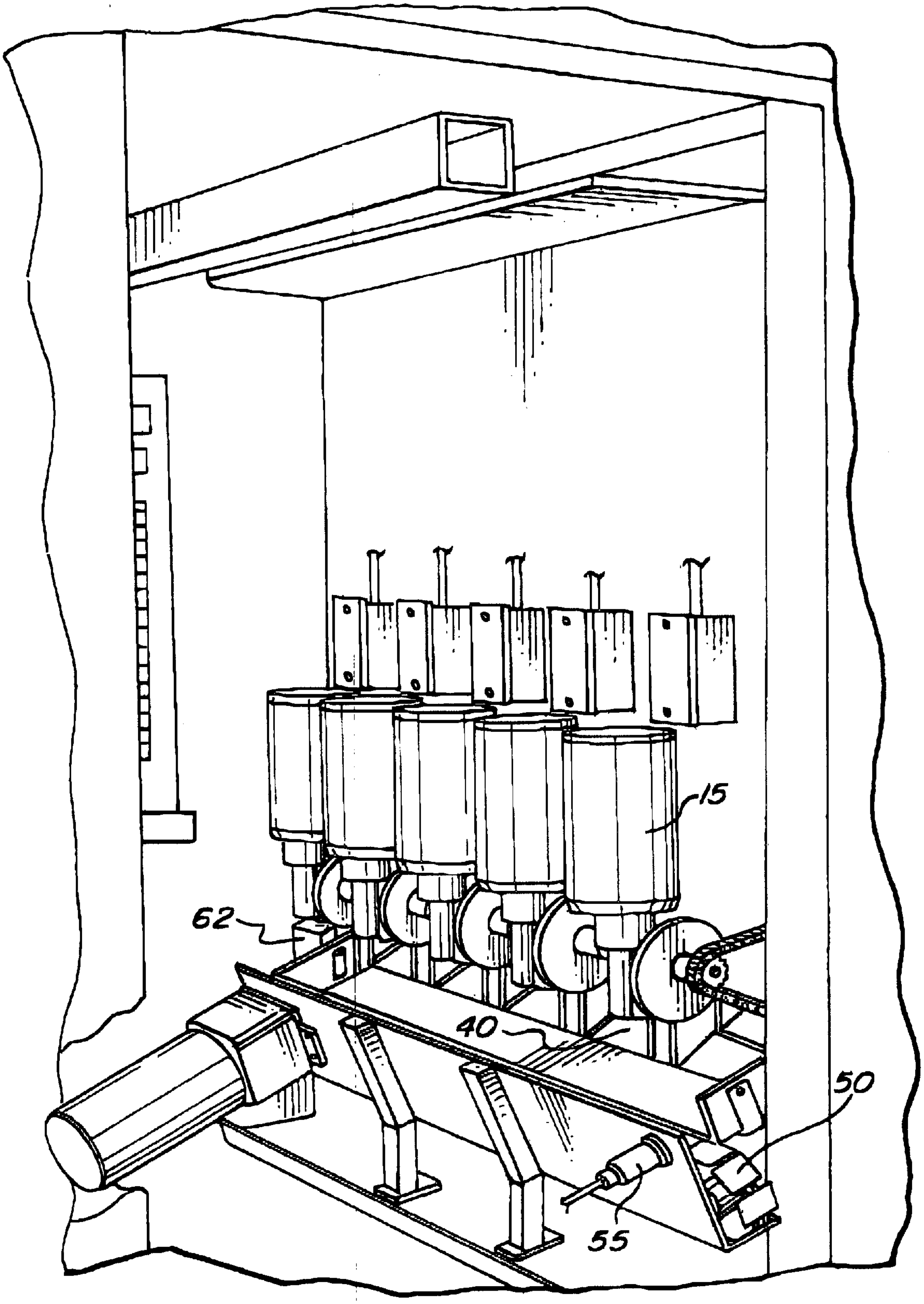
FIG. 3 is an enlarged fragmentary perspective view of the coin roll dispenser of FIG. 1 with the cover removed to show the front portions of the coin magazines.

As seen in FIG. 3, each of the conveyors 16 is separately driven. Preferably, this is achieved by an electric motor 15 affixed to the outside of each magazine 14. Alternatively, a single motor could be utilized to drive all conveyors 16 with a separately actuatable clutch for the conveyor 16 in each magazine 14.

Figure 5:
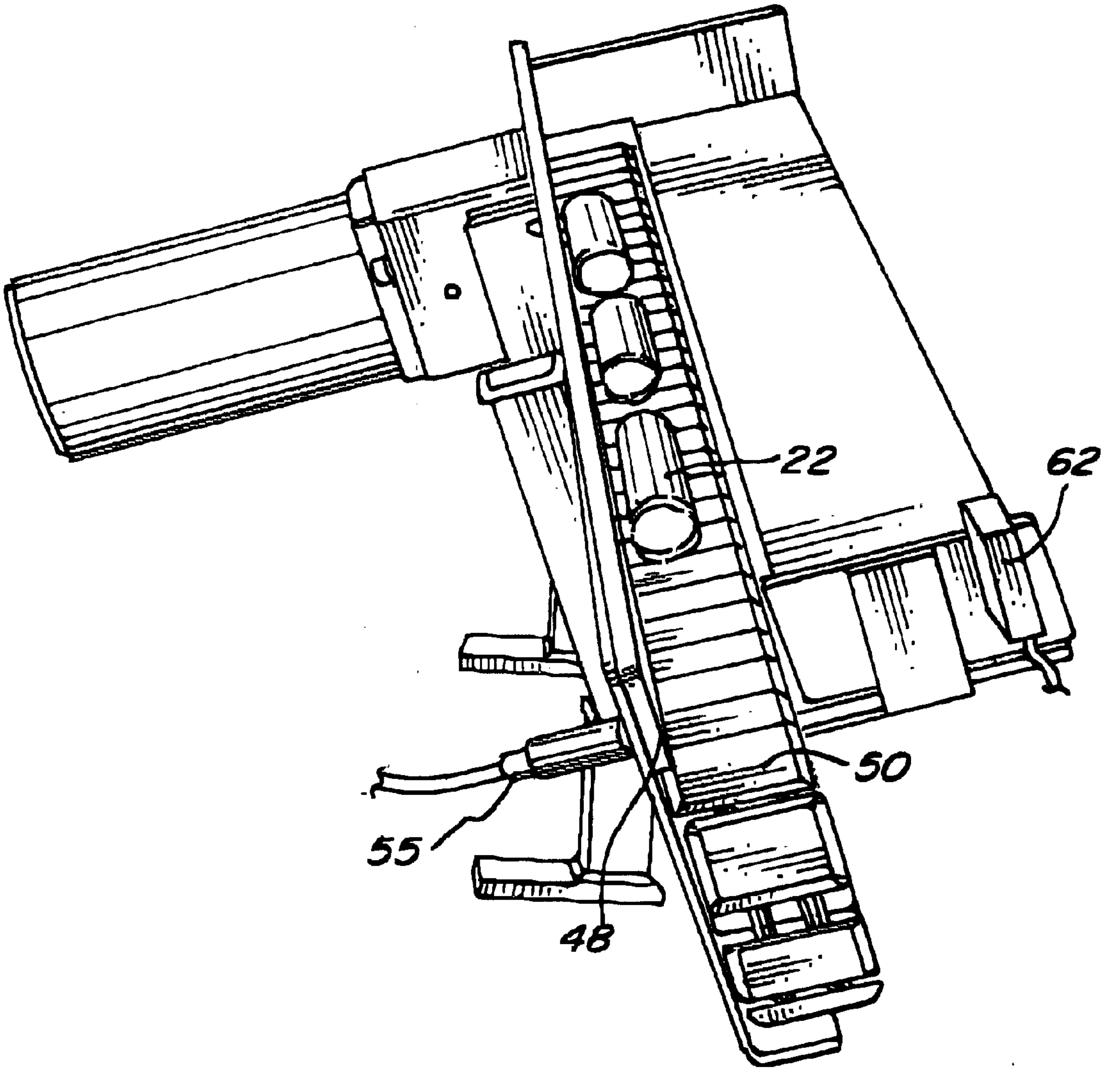
FIG. 5 is a perspective view of the transport conveyor to the discharge chute.

As illustrated in FIGS. 3 and 5, a transverse conveyor generally designated by the numeral 46 is fixed on the frame 10 and extends across the housing from its rear to its front beneath the discharge apertures 40 of the magazines 14. The rolls 22 slide down the drive belt 50 and against the rail 48 and they are moved therealong. Prior to the end of the rail 48 they pass by a proximity sensor 55 which counts the rolls 22.

Figure 4:
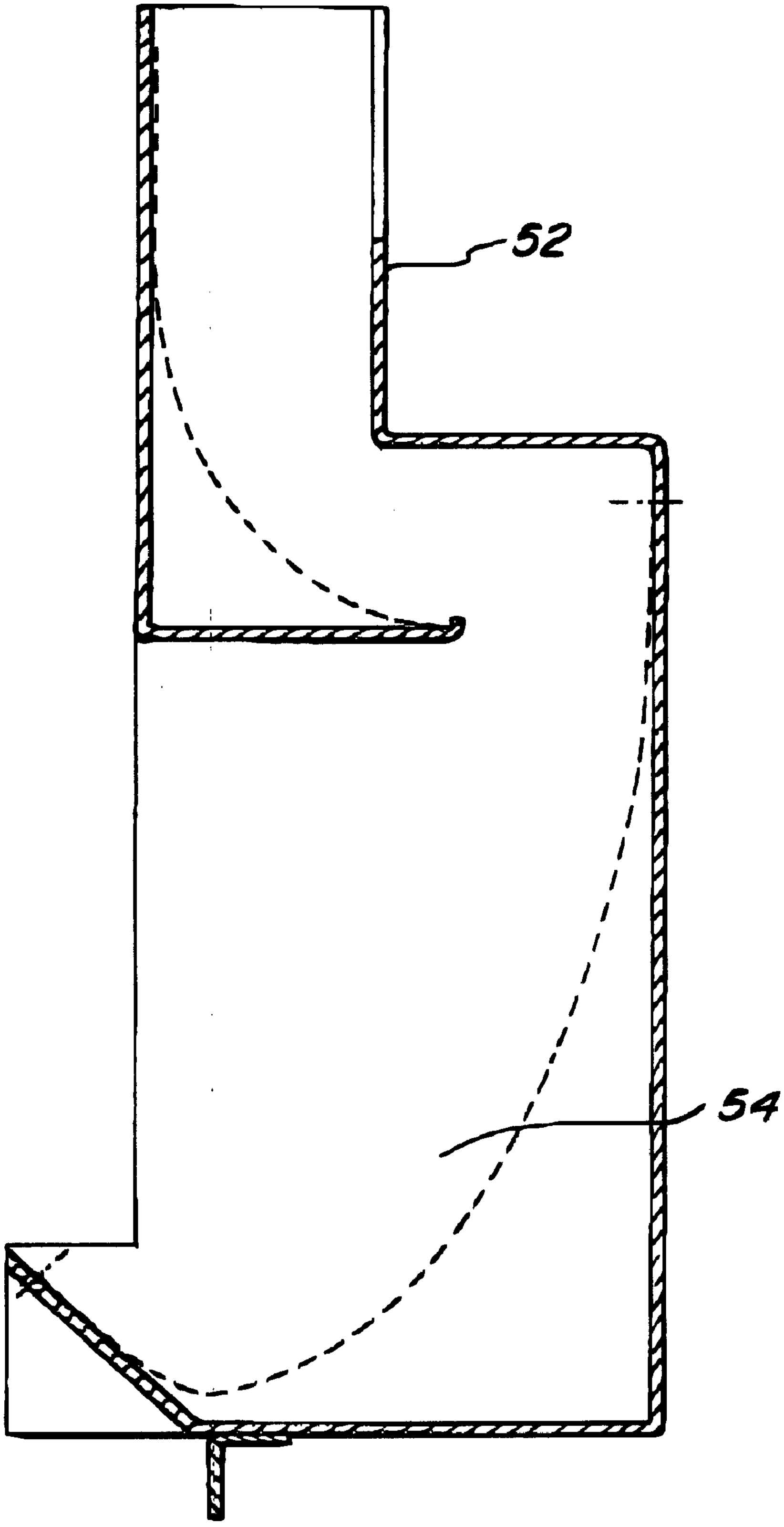
FIG. 4 is a cross sectional view of the coin roll discharge chute and receptacle.

Coin rolls 22 dispensed from any of the magazines 14 are deposited on the transverse conveyor 46 which transports them to a generally vertical chute 52 seen in FIG. 4. The coin rolls 22 exit the chute 52 into a receptacle 54 from which coin rolls may be removed by the patron.

Operation of the coin dispenser is regulated by a control system including a conventional touch screen device 56 which is connected to an internal microprocessor 60. A patron inserts a money card into the card reader 58 and/or currency into the receiver 64. Following recognition of the payment and entry of the details of the order of the patron on device 56, the control system activates the conveyor 16 in a selected magazine 14 to dispense a coin roll 22 of a first denomination therefrom as shown diagrammatically in FIG. 5. The infrared sensor 62 on the frame 10 detects the roll 22 passing through the discharge aperture 40 of any of the magazines 14. When the sensor 62 detects that a coin roll 22 has been dispensed, the microprocessor 60 causes the conveyor 16 to be deactivated. Individual coin rolls 22 are thus sequentially dispensed until the desired count has been achieved for that magazine. The microprocessor 60 will then begin dispensing coin rolls 22 from other magazines 14 until the desired order has been filed.

The induction proximity sensor 55 along the transverse conveyor 46 detects the coin rolls 22 passing therealong toward the receptacle 54. The microprocessor 60 compares the number of rolls of coins dispensed, i.e., the number detected by the first detector 62, with the number detected by the second detector 55 and with the number requested by the patron.

In the event that the transaction is correct, it prints a report on the printer 66. The customer can reach into the opening 68 to the receptacle 54 and remove the coin rolls 22 therefrom. In the event of a discrepancy, the microprocessor 60 provides an error indication, the machine is shut down, and the patron is provided with a printout showing the data compared and the error.

Figure 9:
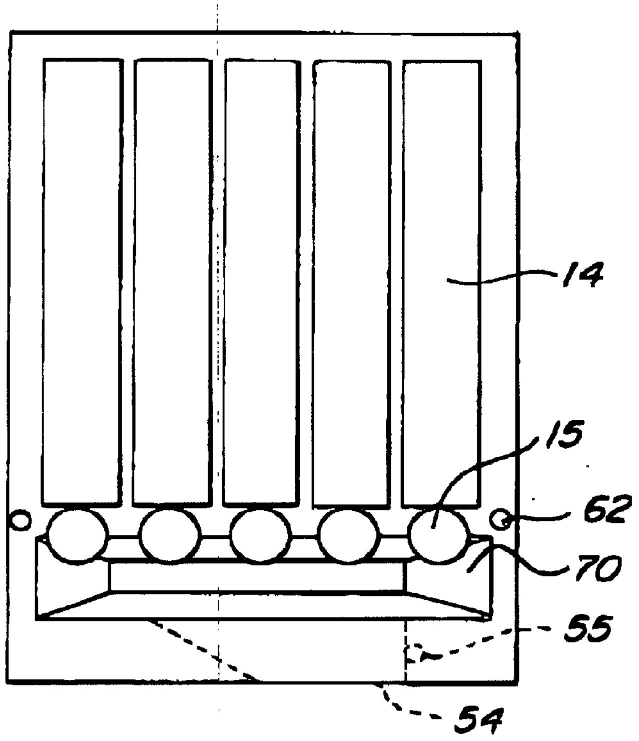
FIG. 9 is a diagrammatic top view of an in-wall unit in which the magazines are perpendicular to the face panel.
Figure 10:
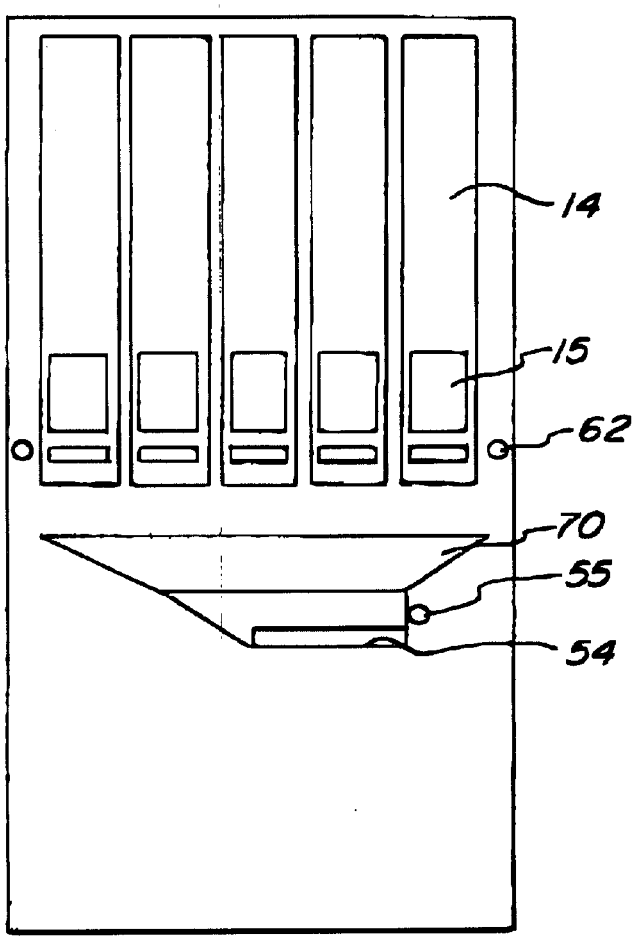
FIG. 10 is a diagrammatic front view thereof.

The previously described embodiment is a free standing unit in which the magazines are oriented parallel to the front wall of the dispenser. In FIGS. 9 and 10, the embodiment is wall mounted with the magazines 14 oriented perpendicularly to the front wall so that the servicing is effected through the rear of the housing. In this embodiment, the coin rolls 22 exit the magazines 14 and drop into a funnel 70 which leads to the receptacle 54*a* from which they may be removed. The sensors 62 and 55 function similarly to provide counts to the microprocessor 60.

As will be readily appreciated, the microprocessor and control system may operate a conveyor to dispense a plurality of rolls before deactivating the motor although that is less precise.

The number of magazines will depend upon the number of coin denominations in a particular country and this may also require a variation in width in the individual magazines.

Thus, it can be seen from the foregoing detailed description and attached drawings that the coin dispenser of the present invention is relatively simple to fabricate, reliable in operation and adaptable to variations in size and denomination of coinage.

Having thus described the invention, what is claimed is:

1. A coin roll dispenser comprising:

(a) a frame;

(b) a plurality of coin magazines removably seated in side-by-side relationship in said frame, each of said magazine being adapted to receive a multiplicity of coin rolls extending transversely thereof, each of said magazines having (i) base, side walls, a rear wall and a front wall defining a compartment for coin rolls and having a discharge aperture in said front wall;

(ii) an endless conveyor in said compartment having pocket recesses along its length each dimensioned to seat and carry an individual coin roll, said conveyor extending at an acute angle relative to said base wall of less than 60° and to said discharge aperture in said front wall, said conveyor being adapted to deliver coin rolls to said discharge aperture;

(iii) flow directing means in said compartment for directing coin rolls into said conveyor pockets, said flow directing means comprising:

(A) a first flow directing member inclined downwardly from said rear wall and at a shallow acute angle relative to the horizontal, said flow directing member terminating adjacent the upper surface of said conveyor to direct coin rolls thereonto;

(B) a second flow directing member projecting from said front wall above said discharge aperture and angled downwardly, said second flow directing member extending over said conveyor and said first flow directing member, said second flow directing member being spaced above said first flow directing member a distance sufficient to allow passage of a vertical stack of a plurality of coin rolls of limited height therebetween; and (C) a separator disposed above said conveyor and below said second flow directing member for blocking passage to said discharge aperture of coin rolls not seated in said conveyor pocket recesses;

(c) drive means for said conveyor; and (d) control means for activating the conveyor in a selected magazine to dispense a desired number of rolls of coins through said discharge aperture, said flow directing members cooperating to orient coin rolls in substantially vertical stacks of limited height.

2. The coin roll dispenser of claim 1 wherein said control means includes first detecting means for detecting coin rolls dispensed from the selected magazine and means for deactivating said conveyor drive means upon detection of a dispensed coin roll.

3. The coin roll dispenser of claim 2 wherein said first detecting means includes an infrared sensor on said frame for detecting coin rolls dispensed from any one of said magazines.

4. The coin roll dispenser of claim 1 wherein said second flow directing member is inclined from said front wall at an angle of about 30° from the horizontal.

5. The coin roll dispenser of claim 1 wherein said flow directing means includes a third flow directing member having an upper surface inclined downwardly from said rear wall at an acute angle to the horizontal and extending above said first flow directing member.

6. The coin roll dispenser of claim 1 wherein each of said magazines has rollers on the outer surface of said base wall thereof for facilitating movement inwardly and outwardly of said frame.

7. The coin roll dispenser of claim 1 wherein said drive means comprises a motor in each of said coin magazines.

8. The coin roll dispenser of claim 1 wherein there is included a housing about said frame enclosing said magazines.

9. The coin roll dispenser of claim 1 wherein there is included means providing a discharge passage from said discharge apertures to a dispenser opening in said housing.

10. The coin roll dispenser of claim 9 wherein there is included a second detection means downstream in said discharge passage for counting all of the coin rolls passing to said dispenser opening.

11. A coin roll dispenser comprising:

(a) a frame;

(b) a housing about said frame;

(c) a plurality of coin magazines removably seated in side-by-side relationship in said frame, each of said magazines being adapted to receive a multiplicity of coin rolls of a single denomination extending transversely thereof, each of said magazines including a motorized conveyor for sequentially dispensing rolls of coins therefrom through a discharge aperture therein, said housing including a receptacle for receiving coin rolls dispensed from said magazines and from which they may be removed by a purchaser;

(d) transport means for transporting dispensed coin rolls from said magazines to said receptacle; and (e) control means for activating the conveyor in a selected one of said magazines, said control means including a first detector for detecting a coin roll dispensed through said discharge aperture of any of said magazines and means for deactivating the previously activated conveyor after each coin roll has been dispensed, and a second detector for detecting coin rolls passing along said transport means toward said receptacle and counting the detected rolls.

12. The coin roll dispenser of claim 11 wherein said second detector is an inductive proximity sensor.

13. The coin roll dispenser of claim 11 wherein said control means includes means for comparing the number of rolls of coins detected by said first detector with the number detected by said second detector and with the number requested by a purchaser and for providing an error indication in the event of a discrepancy.

14. The coin roll dispenser of claim 11 wherein said transport means includes a motorized conveyor on said frame.

15. A coin roll dispenser comprising:

(a) a frame;

(b) a housing on said frame enclosing said magazines;

(c) a plurality of coin magazines removably seated in side-by-side relationship in said frame, each of said magazines being adapted to receive a multiplicity of coin rolls including transversely thereof, each of said magazines having (i) a base, side walls, a rear wall and a front wall defining a compartment for coin rolls and having a discharge aperture in said front wall;

(ii) an endless conveyor in said compartment having pocket recesses along its length each dimensioned to seat and carry an individual coin roll, said conveyor extending at an acute angle relative to said base wall of less than 60° and to a discharge aperture in said front wall, said conveyor being adapted to deliver coin rolls to said discharge aperture;

(iii) flow directing means in said compartment for directing coin rolls into said conveyor pockets, said flow directing means comprising:

(A) a first flow directing member inclined downwardly from said rear wall and at a shallow acute angle relative to the horizontal, said flow directing member terminating adjacent the upper surface of said conveyor to direct coin rolls thereonto;

(B) a second flow directing member projecting from said front wall above said discharge aperture and angled downwardly, said second flow directing member extending over said conveyor and said first flow directing member said second flow directing member being spaced above said first flow directing member a distance sufficient to allow passage of a vertical stack of a plurality of coin rolls of limited height therebetween;

(C) a third flow directing member projecting from said rear wall above said first flow directing member; and (D) a separator disposed above said conveyor and below said second flow directing member for blocking passage to said discharge aperture of coin rolls not seated in said conveyor pocket recesses;

(d) drive means for said conveyor;

(e) control means for activating the conveyor in a selected magazine to dispense a coin roll through said discharge aperture, said flow directing members cooperating to orient coin rolls in substantially vertical stacks of limited height;

(f) first detecting means for detecting coin rolls dispensed from any one of said magazines and means for deactivating said conveyor drive means upon detection of a dispensed coin roll; and (g) means providing a discharge passage from said discharge apertures to a dispenser opening.

16. The coin roll dispenser of claim 15 wherein there is included a second detector downstream in said discharge passage for counting all of the coin rolls passing to said dispenser opening to verify that a predetermined total of coin rolls is being dispensed.

17. The coin roll dispenser of claim 15 wherein said second flow directing member is inclined from said front wall at an angle of about 30° from the horizontal.

18. The coin roll dispenser of claim 15 wherein said magazines have rollers on the outer surface of the base thereof for movement inwardly and outwardly of said frame, and wherein said drive means comprises a motor in each of said coin magazines.

* * * * *